US007877221B2

(12) United States Patent
Fujiwara

(10) Patent No.: US 7,877,221 B2
(45) Date of Patent: Jan. 25, 2011

(54) SENSOR MODULE AND METHOD FOR CORRECTING SENSE OUTPUT SIGNAL THEREFROM

(75) Inventor: Kazunori Fujiwara, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 24 days.

(21) Appl. No.: 12/389,516

(22) Filed: Feb. 20, 2009

(65) Prior Publication Data

US 2009/0234608 A1 Sep. 17, 2009

(30) Foreign Application Priority Data

Mar. 14, 2008 (JP) ............................ 2008-065446

(51) Int. Cl.
*G06F 19/00* (2006.01)

(52) U.S. Cl. ...................................................... 702/104

(58) Field of Classification Search .................. 702/104
See application file for complete search history.

(56) References Cited

FOREIGN PATENT DOCUMENTS

| | | | |
|---|---|---|---|
| JP | 56-021417 | | 2/1981 |
| JP | 09-043264 | | 2/1997 |
| JP | 2003-264462 | * | 9/2003 |

OTHER PUBLICATIONS

Japanese Patent Application Office Action Dated Jan. 19, 2010 with English Translation.

* cited by examiner

*Primary Examiner*—Tung S Lau
(74) *Attorney, Agent, or Firm*—Volentine & Whitt, P.L.L.C.

(57) ABSTRACT

A sense signal outputted from a sensor element and a reference voltage having a constant voltage level are selectively inputted to an amplifier, and amplified signals thereof are sequentially outputted as A/D-converted data by an A/D converter. An average of a predetermined number of A/D-converted data corresponding to the reference voltage is calculated, and a correction value is obtained by subtracting the average from one of the A/D-converted data corresponding to the reference voltage. Corrected data is obtained by subtracting the correction value from each A/D-converted data corresponding to the sense signal outputted from the sensor.

10 Claims, 4 Drawing Sheets

FIG.4A
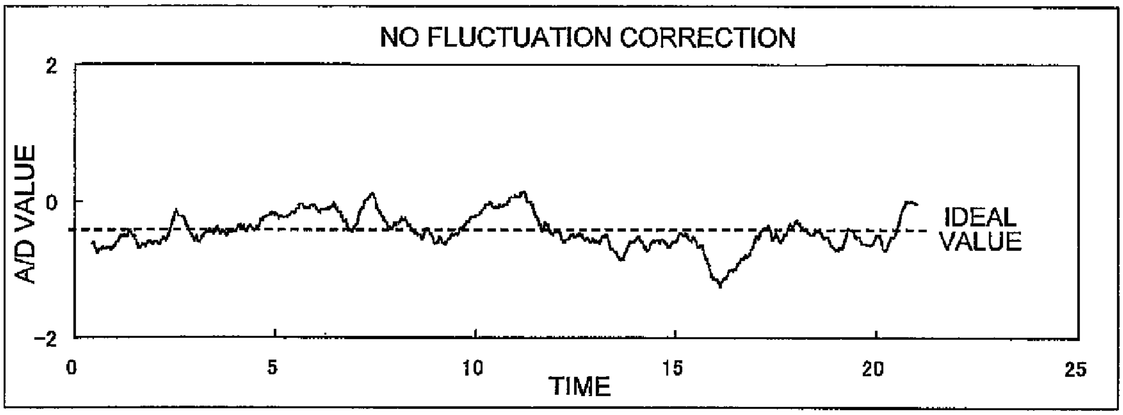
FIG.4B
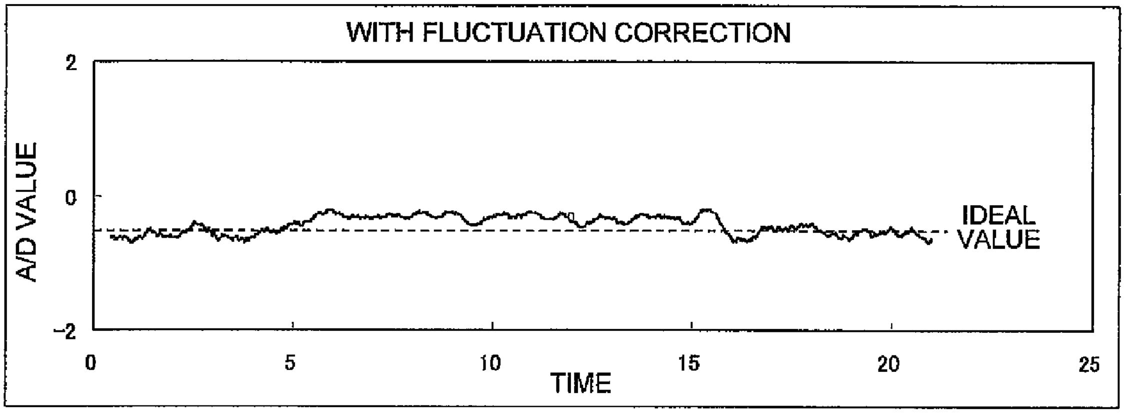
FIG.4C
| STANDARD DEVIATION | |
|---|---|
| NO FLUCTUATION CORRECTION | WITH FLUCTUATION CORRECTION |
| 0.252 | 0.136 |

SENSOR MODULE AND METHOD FOR CORRECTING SENSE OUTPUT SIGNAL THEREFROM

BACKGROUND OF THE INVENTION

1. Field of the Invention

The present invention relates to a sensor module including a sensor element, an amplifier and an analog to digital (A/D) converter.

2. Description of the Related Art

Various sensors including an acceleration sensor, an angular velocity sensor, etc., a differential amplifier for amplifying sense signals outputted from those sensors, and an A/D converter for A/D-converting the amplified sense signals are packaged into one sensor module, which is well known to those skilled in the art. This sensor module can be readily incorporated into another device, and contribute to reducing the number of components of the device and miniaturizing the device.

As a technique for increasing precision of an output signal in an apparatus using a sensor, in Japanese Patent Laid-open Publication No. H9-43264 is disclosed an acceleration detection apparatus which has an acceleration sensor for obtaining an output signal corresponding to an acceleration in a traveling direction of an automobile. This acceleration detection apparatus comprises means for retaining, as a correction signal, the output signal from the acceleration sensor when the number of engine rotations of the automobile is constant, namely, the acceleration in the traveling direction of the automobile is 0, and thereafter removing the correction signal from the output signal from the acceleration sensor. The correction signal includes unnecessary components not related to the acceleration in the traveling direction of the automobile, such as a drift component occurring in the output signal from the acceleration sensor due to a temperature variation or other environmental variations, or a gravitational acceleration component applied to the acceleration sensor when the automobile travels on an uphill road. These unnecessary components are removed by the removing means. Therefore, this acceleration detection apparatus can reduce an error which will occur due to such unnecessary components.

SUMMARY OF THE INVENTION

A sensor module always suffers what is called a fluctuation in a sense output signal resulting from the fact that an output signal from a component other than a sensor, namely, an operational amplifier or A/D converter varies due to a certain factor. That is, a fluctuation component is ceaselessly introduced into a sense output signal finally outputted from the sensor module, thereby making it difficult to obtain the sense output signal with high precision.

An object of the present invention is to provide a sensor module including various sensors, a differential amplifier, an A/D converter, etc., which is capable of removing a fluctuation component resulting from an output variation in a signal processor provided downstream of the sensors, such as the differential amplifier or A/D converter, and obtaining a higher precision of sense output signal, and a method for correcting the sense output signal from the sensor module.

In accordance with an aspect of the present invention, the above and other objects can be accomplished by the provision of a sensor module comprising a sensor element for generating a sense signal corresponding to a sensed amount, an amplifier for amplifying the sense signal and outputting the amplified signal, and an analog to digital (A/D) converter for sequentially A/D-converting the amplified signal with a predetermined timing to obtain A/D-converted data, and sequentially outputting the obtained A/D-converted data, wherein the sensor module further comprises: reference voltage generation portion for generating a reference voltage having a constant voltage level; an input signal selection portion for selectively supplying either one of the sense signal and reference voltage to the amplifier; an averaging portion for calculating an average of a predetermined number of A/D-converted data corresponding to the reference voltage; a correction value generation portion for subtracting the average from one of the A/D-converted data corresponding to the reference voltage and outputting a result of the subtraction as a correction value; and a correction portion for subtracting the correction value from each A/D-converted data corresponding to the sense signal to obtain corrected data, and outputting the obtained corrected data as a sense output signal.

In accordance with another aspect of the present invention, there is provided a method for correcting a sense output signal from a sensor module, the sensor module including a sensor element for generating a sense signal corresponding to a sensed amount, an amplifier for amplifying the sense signal and outputting the amplified signal, and an A/D converter for sequentially A/D-converting the amplified signal with a predetermined timing to obtain A/D-converted data, and sequentially outputting the obtained A/D-converted data, the method comprising: inputting a reference voltage having a constant voltage level to the amplifier and obtaining an average of a predetermined number of A/D-converted data corresponding to the reference voltage; subtracting the average from one of the A/D-converted data corresponding to the reference voltage to obtain a correction value; and inputting the sense signal to the amplifier, subtracting the correction value from each A/D-converted data corresponding to the sense signal to obtain corrected data, and outputting the obtained corrected data as the sense output signal.

BRIEF DESCRIPTION OF THE DRAWINGS

The above and other objects, features and other advantages of the present invention will be more clearly understood from the following detailed description taken in conjunction with the accompanying drawings.

FIG. 4A is a graph illustrating a transition of a sense output signal from the sensor module according to the present embodiment;

FIG. 4B is a graph illustrating a transition of a sense output signal from a conventional sensor module; and FIG. 4C is a table illustrating a comparison between standard deviations of the sense output signal from the sensor module according to the present embodiment and the sense output signal from the conventional sensor module.

DETAILED DESCRIPTION OF THE PREFERRED EMBODIMENTS

Figure 1:
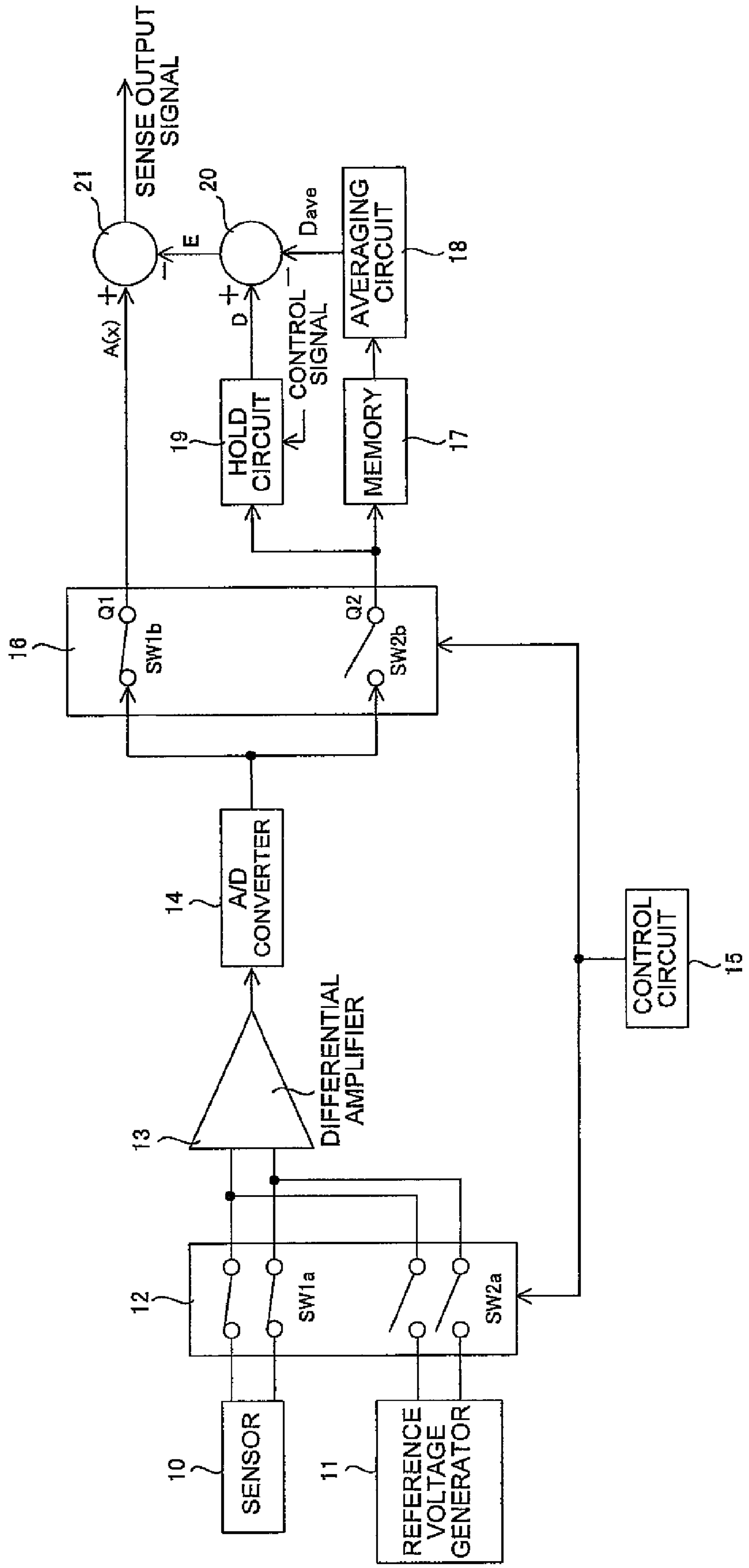
FIG. 1 is a block diagram showing the configuration of a sensor module according to an exemplary embodiment of the present invention.

Hereinafter, preferred embodiments of the invention will be described in conjunction with the annexed drawings. FIG. 1 is a block diagram showing the configuration of a sensor module according to an exemplary embodiment of the present invention. A sensor 10 may be, for example, a piezoresistor-type three-axis acceleration sensor. The piezoresistor-type acceleration sensor has a structure consisting of a frame, mass and beam which are formed from silicon as a base material using a micro electro-mechanical system (MEMS) technique, in which piezoresistors are disposed on the beam. A piezoresistor is an element whose resistance varies due to a variation in the number of carriers or mobility in a semiconductor crystal lattice when an external mechanical force is applied to the crystal lattice so as to deform it. When an acceleration is applied to a sensor chip, the mass moves and deformation occurs on the beam. Stress occurs in the piezoresistors on the beam due to the deformation, resulting in a variation in resistance. In the piezoresistor-type acceleration sensor, a bridge circuit is formed with the piezoresistors to output the variation in the resistance of the piezoresistors as an electrical signal. That is, a sense voltage Vs having a voltage level corresponding to the acceleration applied to the sensor element is generated between output terminals of the sensor 10.

A reference voltage generator 11 is a direct current (DC) voltage generation circuit that generates a reference voltage Vref having a constant voltage level between output terminals thereof. The reference voltage generator 11 may be implemented with, for example, a bandgap circuit, etc. such that the reference voltage Vref can always be maintained at a stable DC voltage level, not dependent on an ambient temperature or supply voltage.

An input switching circuit 12 is a switching circuit that switches an input voltage to a differential amplifier 13. To this end, the input switching circuit 12 includes a first switch SW1*a* for switching the input/cutoff of the sense voltage Vs from the sensor 10 to the differential amplifier 13, and a second switch SW2*a* for switching the input/cutoff of the reference voltage Vref from the reference voltage generator 11 to the differential amplifier 13. The switching of each switch is carried out based on a control signal supplied from a control circuit 15.

The differential amplifier 13 has two input terminals, and amplifies and outputs a difference between voltages applied to the two input terminals. The sense voltage Vs supplied from the sensor 10 or the reference voltage Vref supplied from the reference voltage generator 11 is outputted as a signal amplified by a predetermined amplification factor by the differential amplifier 13. The reason why the signal amplification is performed using the differential amplifier 13 in this manner is that the sense voltage Vs from the sensor 10 is weak and thus needs to be raised to a voltage level required for A/D conversion thereof. Also, because the differential amplifier 13 amplifies a difference between signals at the input terminals thereof, even though noise is introduced into the signals, it hardly matters in that it is difficult to appear as an electrical signal difference.

An A/D converter 14 samples the amplified signal of the sense voltage Vs or reference voltage Vref supplied from the differential amplifier 13 at a predetermined period to convert the amplified signal into a digital amount corresponding to the magnitude thereof, and sequentially outputs the converted digital amount as A/D-converted data. The A/D converter 14 may be, for example, a known consecutive comparison type A/D converter, and samples and holds the amplified signal of the sense voltage Vs or reference voltage Vref supplied from the differential amplifier 13, converts the sampled and held signal into a digital amount while performing comparison beginning with a most significant bit, and sequentially outputs the converted digital amount.

An output switching circuit 16 includes a first switch SW1*b* and a second switch SW2*b*, each of which is turned on/off based on a control signal supplied from the control circuit 15. With this configuration, A/D-converted data A(x) corresponding to the sense voltage Vs from the sensor 10, sequentially outputted from the A/D converter 14, is outputted from an output terminal Q1 through the first switch SW1*b*, and A/D-converted data D(x) corresponding to the reference voltage Vref from the reference voltage generator 11, sequentially outputted from the A/D converter 14, is outputted from an output terminal Q2 through the second switch SW2*b*.

The control circuit 15 supplies control signals to the input switching circuit 12 and the output switching circuit 16 to control ON/OFF of each switch of the input switching circuit 12 so as to alternately supply the sense voltage Vs and the reference voltage Vref to the differential amplifier 13 with a predetermined timing, and to synchronize an ON/OFF timing of the first and second switches of the output switching circuit 16 with an ON/OFF timing of the first and second switches of the input switching circuit 12 so as to bisect output sources of an A/D-converted output of the sense voltage Vs and an A/D-converted output of the reference voltage Vref, as stated above. That is, the control circuit 15 operatively associates the ON/OFF timing of the output switching circuit 16 with the ON/OFF timing of the input switching circuit 12 such that an A/D-converted output corresponding to the sense voltage Vs from the sensor 10 is outputted from the output terminal Q1 through the first switch SW1*b* and an A/D-converted output corresponding to the reference voltage Vref from the reference voltage generator 11 is outputted from the output terminal Q2 through the second switch SW2*b*.

A memory 17 is a storage medium for storing some of the A/D-converted data D(x) corresponding to the reference voltage Vref, sequentially supplied through the second switch SW2*b* of the output switching circuit 16. In an initialization operation upon power-on to be described later, the memory 17 stores, for example, 100 sampled data, among the A/D-converted data corresponding to the reference voltage Vref, sequentially supplied.

An averaging circuit 18 calculates an average Dave of the A/D-converted data of the reference voltage Vref stored in the memory 17 and retains the calculated average.

A hold circuit 19 holds one A/D-converted data D included in the A/D-converted data D(x) corresponding to the reference voltage Vref, sequentially supplied through the second switch SW2*b* of the output switching circuit 16, based on a control signal and outputs the held data.

A first subtracter 20 subtracts the average Dave retained by the averaging circuit 18 from the A/D-converted data D of the reference voltage Vref held by the hold circuit 19 and outputs a result of the subtraction as a correction value E ($=D-D_{ave}$).

A second subtracter 21 subtracts the subtraction result of the first subtracter 20, or the correction value E, from the A/D-converted data A(x) corresponding to the sense voltage Vs from the sensor 10, sequentially supplied through the first switch SW1*b* of the output switching circuit 16, and outputs a result of the subtraction as corrected data M(x) (=A(x)−E). This corrected data M(x) is a final sense output signal from the sensor module of the present invention.

Figure 2:
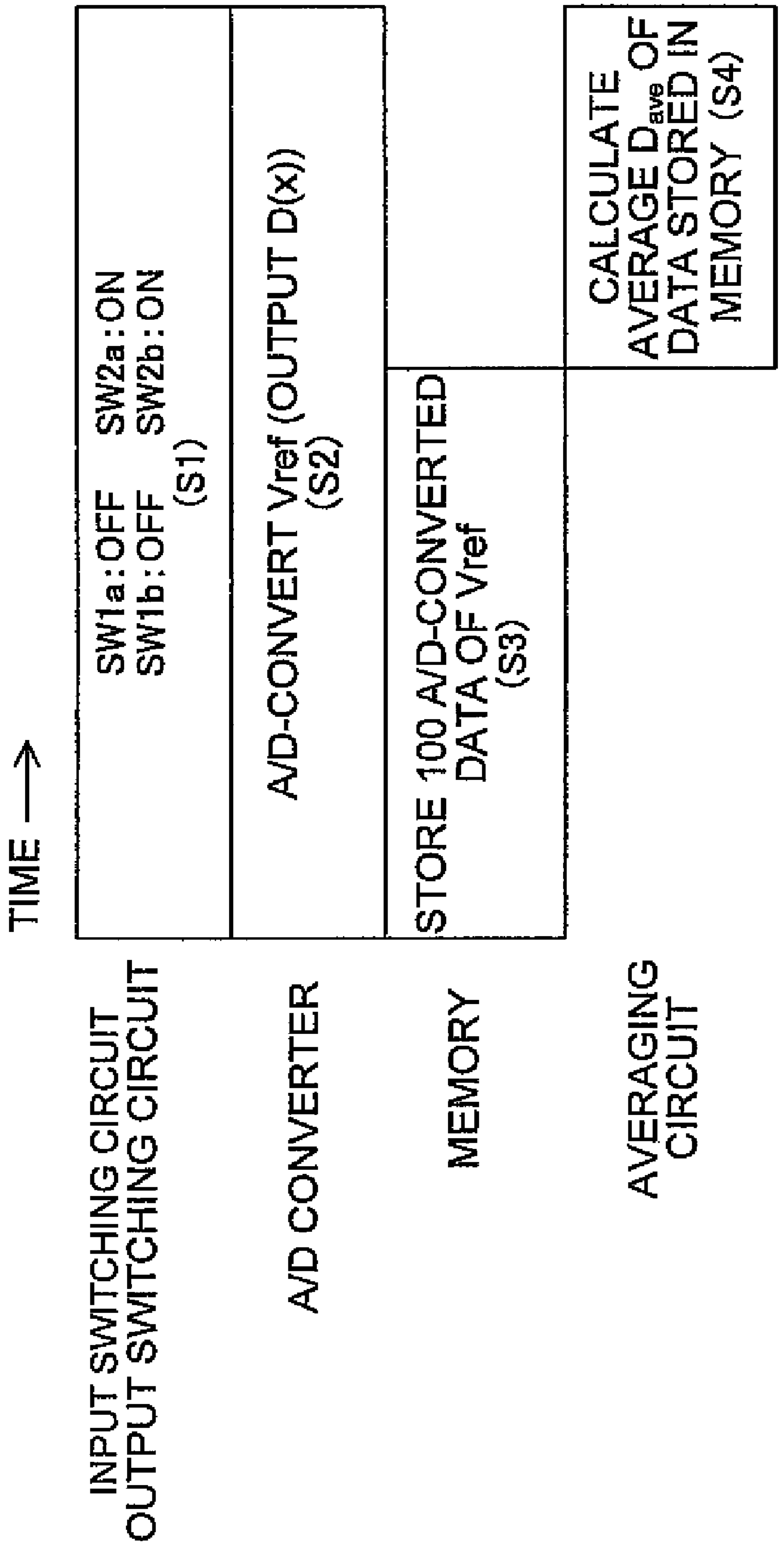
FIG. 2 is a view illustrating an initialization operation of the sensor module according to the present embodiment.
Figure 3:
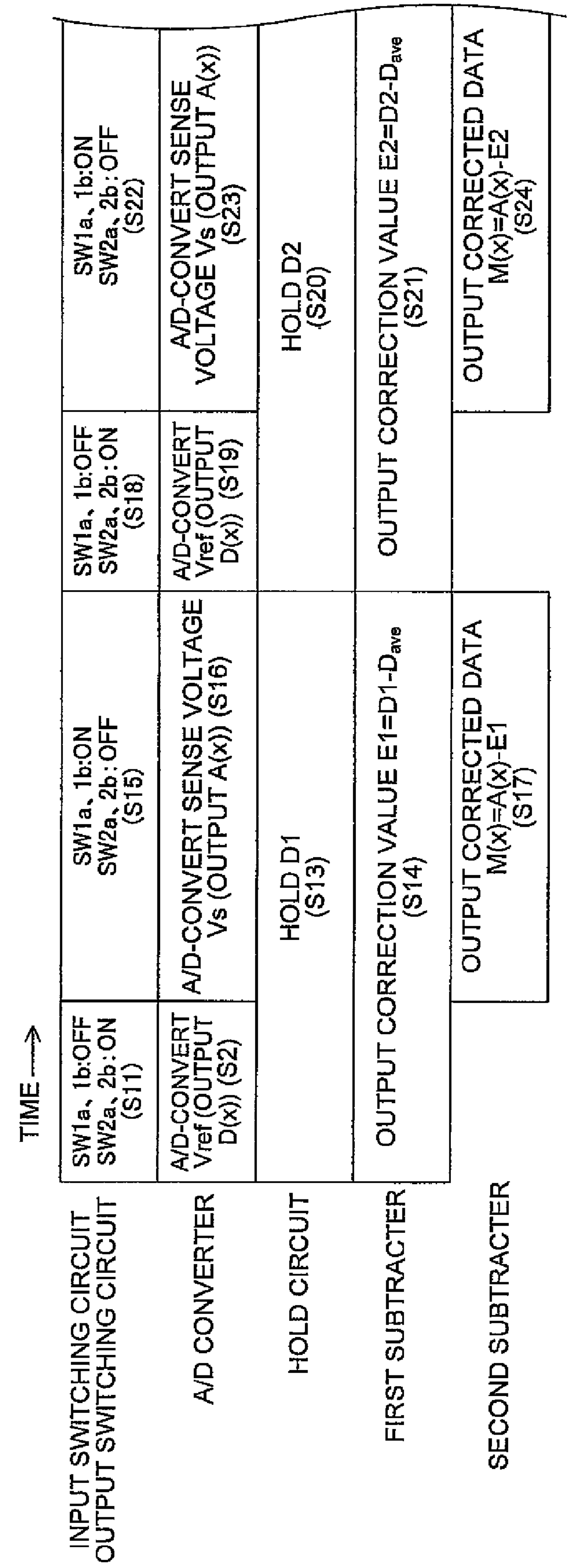
FIG. 3 is a view illustrating a sensing operation of the sensor module according to the present embodiment.

Next, the operation of the sensor module with the above-stated configuration according to the present embodiment will be described with reference to FIGS. 2 and 3. FIGS. 2 and 3 are timing charts illustrating the operations of the respective functional blocks constituting the sensor module. FIG. 2 illustrates an initialization operation of the sensor module when the sensor module is powered on, and FIG. 3 illustrates an acceleration sensing operation of the sensor module.

First, the initialization operation of the sensor module will be described with reference to FIG. 2. Upon application of power to the sensor module, the initialization operation of the sensor module is started. In this initialization operation, the averaging circuit 18 calculates an average of the reference voltage Vref outputted from the reference voltage generator 11 within a certain period and retains the calculated average. That is, upon application of power to the sensor module, the control circuit 15 supplies control signals to the input switching circuit 12 and the output switching circuit 16 to turn off the first switch SW1*a* of the input switching circuit 12 and turn on the second switch SW2*a* thereof and turn off the first switch SW1*b* of the output switching circuit 16 and turn on the second switch SW2*b* thereof (S1). As a result, the reference voltage Vref generated between the output terminals of the reference voltage generator 11 is applied to the differential amplifier 13. Then, the differential amplifier 13 generates an amplified signal by amplifying the reference voltage Vref by a predetermined amplification factor, and supplies the generated amplified signal to the A/D converter 14.

The A/D converter 14 samples the amplified signal of the reference voltage Vref supplied thereto at a predetermined sampling period and sequentially outputs the sampled signal as A/D-converted data D(x) (S2). Also, the A/D-converted data D(x) is superimposed by a fluctuation component as the input voltage is passed through the differential amplifier 13 and the A/D converter 14.

The A/D-converted data D(x) corresponding to the reference voltage Vref, sequentially outputted from the A/D converter 14, is supplied to the memory 17 through the second switch SW2*b* of the output switching circuit 16. The memory 17 stores for example, 100 data, among the A/D-converted data of the reference voltage Vref periodically supplied correspondingly to the sampling period of the A/D converter 14 (S3). Also, the data stored in the memory 17 is retained therein until the sensor module is powered off.

The averaging circuit 18 extracts the 100 data stored in the memory 17, calculates an average Dave of the extracted data and retains the calculated average (S4). A fluctuation component can be offset by averaging a plurality of A/D-converted data superimposed by the fluctuation component by means of the averaging circuit 18. That is, the average Dave calculated by the averaging circuit 18 is defined as a true value of the reference voltage Vref after amplification from which the fluctuation component was removed, and is used to extract the fluctuation component in the sensing operation of the sensor module of the present invention to be described below. When the calculation of the average Dave is completed, the initialization operation is ended.

Also, the average $D_{ave}$ is calculated when a normal calibration temperature of the sensor is measured (when a sensitivity offset value of the sensor is acquired), and then stored in a nonvolatile memory or the like. Therefore, it is also possible to correct a variation in the reference voltage Vref resulting from a temperature variation without carrying out the measurement again upon application of power.

Next, the acceleration sensing operation of the sensor module after completion of the initialization operation will be described with reference to FIG. 3. The control circuit 15 supplies control signals to the input switching circuit 12 and the output switching circuit 16 to turn off the first switch SW1*a* of the input switching circuit 12 and turn on the second switch SW2*a* thereof and turn off the first switch SW1*b* of the output switching circuit 16 and turn on the second switch SW2*b* thereof (S11). As a result, the reference voltage Vref generated between the output terminals of the reference voltage generator 11 is applied to the differential amplifier 13. Then, the differential amplifier 13 generates an amplified signal by amplifying the reference voltage Vref by a predetermined amplification factor, and supplies the generated amplified signal to the A/D converter 14. The A/D converter 14 samples the amplified signal of the reference voltage Vref supplied thereto at a predetermined sampling period and sequentially outputs the sampled signal as A/D-converted data D(x) (S12). The A/D-converted data D(x) is superimposed by a fluctuation component as the input voltage is passed through the differential amplifier 13 and the A/D converter 14. The A/D-converted data D(x) corresponding to the reference voltage Vref, outputted from the A/D converter 14, is supplied to the hold circuit 19 through the second switch SW2*b* of the output switching circuit 16. The hold circuit 19 holds one data D1 included in the A/D-converted data D(x) sequentially supplied thereto with a timing based on a control signal and outputs the held data (S13). The A/D-converted data D1 held by the hold circuit 19 is supplied to the first subtracter 20. The first subtracter 20 subtracts the average Dave acquired in the initialization operation from the A/D-converted data D1 and outputs a result of the subtraction as a correction value E1 (=D1−$D_{ave}$) (S14). That is, because the average Dave is a true value of the reference voltage Vref from which the fluctuation component was removed, as stated previously, and D1 is A/D-converted data of the reference voltage Vref including the fluctuation component, it is possible to extract only the fluctuation component by subtracting $D_{ave}$ from D1. Namely, the correction value E1 outputted from the first subtracter 10 represents the magnitude of the fluctuation component at a data D1 acquisition time. Also, because the data stored in the memory 17 and the average Dave of the averaging circuit 18 are those set and retained in the initialization step, they are not changed in the acceleration sensing operation.

Then, the control circuit 15 supplies control signals to the input switching circuit 12 and the output switching circuit 16 to turn on the first switch SW1*a* of the input switching circuit 12 and turn off the second switch SW2*a* thereof and turn on the first switch SW1*b* of the output switching circuit 16 and turn off the second switch SW2*b* thereof (S15). As a result, the sense voltage Vs generated between the output terminals of the sensor 10 is applied to the differential amplifier 13. Then, the differential amplifier 13 generates an amplified signal by amplifying the sense voltage Vs by a predetermined amplification factor, and supplies the generated amplified signal to the A/D converter 14. The A/D converter 14 samples the amplified signal of the sense voltage Vs supplied thereto at a predetermined sampling period and sequentially outputs the sampled signal as A/D-converted data A(x) (S16). Also, the A/D-converted data A(x) is superimposed by a fluctuation component as the input voltage is passed through the differential amplifier 13 and the A/D converter 14. The A/D-converted data A(x) corresponding to the sense voltage Vs from the sensor 10, outputted from the A/D converter 14, is sequentially supplied to the second subtracter 21 through the first switch SW1*b* of the output switching circuit 16. The second subtracter 21 subtracts the correction value El (=D1−$D_{ave}$) outputted from the first subtracter 20 from each of the A/D-converted data of the sense voltage Vs sequentially supplied thereto and outputs a result of the subtraction as corrected data M(x) (=A(x)−E1) (S17). As stated above, the correction value E1 supplied from the first subtracter 10 represents the magnitude of the fluctuation component at the data D1 acquisition time. The subtracter 21 removes the fluctuation component by subtracting the correction value E1 from each of the A/D-converted data of the sense voltage Vs superimposed by the fluctuation component. In this manner, the fluctuation correction is carried out with respect to the sense output signal.

Because the fluctuation component always varies in magnitude, the correction value acquisition and correction process is carried out at intervals of a predetermined period. That is, after acquiring a predetermined number of A/D-converted data of the sense voltage Vs from the sensor 10, the control circuit 15 again supplies control signals to the input switching circuit 12 and the output switching circuit 16 to turn off the first switch SW1*a* of the input switching circuit 12 and turn on the second switch SW2*a* thereof and turn off the first switch SW1*b* of the output switching circuit 16 and turn on the second switch SW2*b* thereof (S18). As a result, the reference voltage Vref is again applied to the differential amplifier 13. The A/D converter 14 converts an amplified signal of the reference voltage Vref supplied thereto into A/D-converted data D(x) (S19) and supplies the A/D-converted data to the hold circuit 19 through the output switching circuit 16. The hold circuit 19 holds one data D2 included in the new A/D-converted data D(x) sequentially supplied thereto with a timing based on a control signal and outputs the held data (S20). The first subtracter 20 subtracts the average $D_{ave}$ from the A/D-converted data D2 held by the hold circuit 19 and outputs a result of the subtraction as a new correction value E2 (=D2−$D_{ave}$) (S21). The new correction value E2 represents the magnitude of the fluctuation component at a data D2 acquisition time. The correction value may be updated one after another.

Then, the control circuit 15 controls the input switching circuit 12 and the output switching circuit 16 to operate in synchronism. Specifically, the control circuit 15 supplies control signals to the input switching circuit 12 and the output switching circuit 16 to turn on the first switch SW1*a* of the input switching circuit 12 and turn off the second switch SW2*a* thereof and turn on the first switch SW1*b* of the output switching circuit 16 and turn off the second switch SW2*b* thereof (S22). As a result, new A/D-converted data A(x) corresponding to the sense voltage Vs from the sensor 10 is obtained (S23). The second subtracter 21 subtracts the new correction value E2 from each of the new A/D-converted data A(x) sequentially supplied thereto, so as to output, as the sense output signal, corrected data M(x) from which the fluctuation component occurring in the new period was removed (S24).

As described above, in the initialization operation, the sensor module of the present invention passes a reference voltage Vref having a constant voltage level through the differential amplifier 13 and the A/D converter 14 to acquire A/D-converted data superimposed by a fluctuation component, and averages the acquired A/D-converted data to obtain an average $D_{ave}$ corresponding to a true value of the reference voltage Vref from which the fluctuation component was offset. In the sensing operation, the sensor module of the present invention specifies the fluctuation component by subtracting the average $D_{ave}$ from A/D-converted data D corresponding to the reference voltage Vref at a certain time. Then, the sensor module corrects the output of the sensor by subtracting the fluctuation component from each A/D-converted data corresponding to the sensor output, and outputs the correction result as a final sense output signal. Therefore, it is possible to eliminate the effect of the fluctuation component and obtain a high precision of sense output signal. Also, because the extraction of the fluctuation component, namely, the acquisition of the correction value is periodically performed as stated above, it is possible to properly perform the correction with respect to the fluctuation component always varying. Further, it is preferable that a period in which the reference voltage generator 11 is connected to the differential amplifier 13 for acquisition of the correction value E is as short as possible.

FIG. 4A is a graph illustrating a transition of a sense output signal from the sensor module of the present invention under the condition that an acceleration is 0, which plots a moving average of 100 data measured for 22 hours. FIG. 4B is a graph illustrating, as a comparative example, a transition of a sense output signal from a conventional sensor module with no fluctuation correction function under the same condition. Also, a broken line shown in each graph represents an ideal value of the sense output signal. As apparent from comparison between the two graphs, it can be seen that an output variation from the ideal value is significantly reduced by performing fluctuation correction with respect to the sense output signal. FIG. 4C illustrates standard deviations of the two sense output signals. It can be understood from FIG. 4C that the deviation of the sense output signal, namely, the fluctuation component superimposing the sense output signal is reduced by almost half owing to the effect of the fluctuation correction.

Also, although the sensor 10 has been described for illustrative purposes in the above embodiment to be an acceleration sensor, it is applicable to all sensors including an angular velocity sensor, temperature sensor, magnetometric sensor, pressure sensor, etc. Also, the A/D converter 14 is not limited to a consecutive comparison type A/D converter, but may be an A/D converter of any other type such as a charge equilibration type or dual integral type. In addition, although the sensor module has been described in the above embodiment to acquire A/D-converted data of a reference voltage Vref, specify a fluctuation component based on the acquired A/D-converted data, and then receive the output of the sensor and subtract the fluctuation component from the received sensor output, it may receive and retain the sensor output in advance, and then specify the fluctuation component and subtract the fluctuation component from the retained sensor output.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2008-065446 which is hereby incorporated by reference.

What is claimed is:

1. A sensor module comprising:

a sensor element for generating a sense signal corresponding to a sensed amount;

an amplifier for amplifying the sense signal and outputting the amplified signal;

an analog to digital (A/D) converter for sequentially A/D-converting the amplified signal with a predetermined timing to obtain A/D-converted data, and sequentially outputting the obtained A/D-converted data;

a reference voltage generation portion for generating a reference voltage having a constant voltage level;

an input signal selection portion for selectively supplying either one of the sense signal and reference voltage to the amplifier;

an averaging portion for calculating an average of a predetermined number of A/D-converted data corresponding to the reference voltage;

a correction value generation portion for subtracting the average from one of the A/D-converted data corresponding to the reference voltage and outputting a result of the subtraction as a correction value; and a correction portion for subtracting the correction value from each A/D-converted data corresponding to the sense signal to obtain corrected data, and outputting the obtained corrected data as a sense output signal.

2. The sensor module according to claim 1, wherein the input signal selection portion comprises an input switching circuit including a first switch for switching supply and cutoff of the sense signal to the amplifier, and a second switch for switching supply and cutoff of the reference voltage to the amplifier.

3. The sensor module according to claim 1, further comprising an output switching circuit; wherein:

the correction portion includes a first subtracter for subtracting the correction value from each A/D-converted data corresponding to the sense signal;

the averaging portion includes a memory for storing the predetermined number of A/D-converted data corresponding to the reference voltage and an averaging circuit for performing averaging of stored A/D-converted data in the memory;

the correction value generation portion includes a second subtracter for subtracting the average from one of the A/D-converted data corresponding to the reference voltage; and the output switching circuit includes a third switch for switching supply and cutoff of the A/D-converted data corresponding to the sense signal to the first subtracter, and a fourth switch for switching supply and cutoff of the A/D-converted data corresponding to the reference voltage to the memory and the second subtracter.

4. The sensor module according to claim 3, wherein the third switch and the fourth switch are alternately switched on and off.

5. The sensor module according to claim 4, further comprising a controller for controlling the input switching circuit and the output switching circuit to operate in synchronism.

6. A sensor module comprising:

a sensor element for generating a sense signal corresponding to a sensed amount;

an amplifier for amplifying the sense signal and outputting the amplified signal;

an analog to digital (A/D) converter for sequentially A/D-converting the amplified signal with a predetermined timing to obtain A/D-converted data, and sequentially outputting the obtained A/D-converted data;

a reference voltage generation portion for generating a reference voltage having a constant voltage level;

an input signal selection portion for selectively supplying either one of the sense signal and the reference voltage to the amplifier;

an averaging portion for performing averaging of a predetermined number of first A/D-converted data corresponding to the reference voltage thereby obtaining average value data;

a correction value generation portion for extracting a fluctuation component superimposed on the first A/D-converted data, by subtracting the average value data from one of the first A/D-converted data corresponding to the reference voltage and outputting an extracted fluctuation component as a correction value; and a correction portion for subtracting the correction value from each of second A/D-converted data corresponding to the sense signal to remove the fluctuation component superimposed on the second A/D-converted data, and outputting a resultant data as a sense output signal.

7. The sensor module according to claim 6, wherein the input signal selection portion comprises an input switching circuit including a first switch for switching supply and cutoff of the sense signal to the amplifier, and a second switch for switching supply and cutoff of the reference voltage to the amplifier.

8. The sensor module according to claim 6, further comprising an output switching circuit, wherein the correction portion includes a first subtracter for subtracting the correction value from each of the second A/D-converted data corresponding to the sense signal, the averaging portion includes a memory for storing the predetermined number of the first A/D-converted data corresponding to the reference voltage and an averaging circuit for performing averaging of stored first A/D-converted data in the memory, the correction value generation portion includes a second subtracter for subtracting the average from one of the first A/D-converted data corresponding to the reference voltage, and the output switching circuit includes a third switch for switching supply and cutoff of the second A/D-converted data corresponding to the sense signal to the first subtracter, and a fourth switch for switching supply and cutoff of the first A/D-converted data corresponding to the reference voltage to the memory and the second subtracter.

9. The sensor module according to claim 8, wherein the third switch and the fourth switch are alternately switched on and off.

10. The sensor module according to claim 9, further comprising a controller for controlling the input switching circuit and the output switching circuit to operate in synchronism.

* * * * *